United States Patent [19]

Livesay et al.

[11] Patent Number: 5,837,185

[45] Date of Patent: Nov. 17, 1998

[54] PREPARATION OF BOAT HULLS

[76] Inventors: Mark Livesay, 1374 Merritt Dr., El Cajon, Calif. 92020; Maury Shepherd, 2702 Arbuckle St., Houston, Tex. 77005

[21] Appl. No.: 681,275

[22] Filed: Jul. 22, 1996

Related U.S. Application Data

[63] Continuation of Ser. No. 258,389, Jun. 9, 1994, abandoned.

[51] Int. Cl.$^6$ ............................. B29C 43/12; B29C 70/02
[52] U.S. Cl. ......................... 264/511; 264/102; 264/257; 264/258; 264/DIG. 78
[58] Field of Search .............................. 156/87, 285, 286, 156/382, 405.1; 264/102, 511, 257, 258, DIG. 53, DIG. 78, 136, 137

[56] References Cited

U.S. PATENT DOCUMENTS

| | | | |
|---|---|---|---|
| 2,913,036 | 11/1959 | Smith | 264/102 |
| 3,344,007 | 9/1967 | Skoggard | 156/285 |
| 4,265,723 | 5/1981 | Hesse et al. | 522/16 |
| 4,311,661 | 1/1982 | Palmer | 264/102 |
| 4,879,073 | 11/1989 | Kromrey | 264/137 |
| 4,902,215 | 2/1990 | Seemann, III | 425/406 |
| 4,915,896 | 4/1990 | Rachal | 264/511 |
| 5,116,216 | 5/1992 | Cochran et al. | 264/102 |
| 5,129,813 | 7/1992 | Shepherd | 425/504 |
| 5,166,007 | 11/1992 | Smith et al. | 428/63 |
| 5,316,462 | 5/1994 | Seemann | 425/405.1 |
| 5,344,515 | 9/1994 | Chenock, Jr. | 156/171 |
| 5,439,635 | 8/1995 | Seemann | 425/405.1 |
| 5,591,784 | 1/1997 | Muranaka | 522/74 |

OTHER PUBLICATIONS

Handbook of Composites, 1982, p. 379.

*Primary Examiner*—Richard Crispino
*Attorney, Agent, or Firm*—John Lezdey

[57] ABSTRACT

A process for preparing fiber reinforced composite structures utilizing resin transfer molding techniques with vacuum and a resin which is capable of being cured with a peroxide catalyst or photocuring or a combination thereof.

12 Claims, No Drawings

PREPARATION OF BOAT HULLS

This is a continuation of application Ser. No. 08/258,389, filed Jun. 9, 1994, now abandoned.

FIELD OF THE INVENTION

The present invention relates to a novel process for the preparation of reinforced composite structures comprising one or more layers of materials. More particularly, there is provided an improvement in resin transfer molding utilizing a vacuum directed fabrication. The process is especially useful for preparing prepregs composite parts with photo-curable resins.

BACKGROUND OF THE INVENTION

Fiber reinforced-resin composites have found a broad utility in structure requiring high strength-to-weight ratios. The fiber reinforced-resin composites used in such products have usually been produced by forming a lay-up, e.g., layers or plies of unidirectional or multidirectional fabrics made of glass or graphite fibers, impregnated with a resin and cured. This resin impregnation is generally done by either a wet lay-up or dry lay-up technique. In the wet lay-up process the fibrous reinforcement materials are preimpregnated with a resin and curing catalyst and partially cured.

Such "prior composites" are positioned upon a forming tool or a mold surface which, in its simplest form may comprise a flat plate. In the dry lay-up method, the fiber reinforcement is laid up dry on a forming tool or a mold surface and the resin may be applied by conventional methods known to the art, e.g., brushing, spraying or coating, etc.

After the lay-up is prepared, heat and pressure are applied. The heat cures the resin and the pressure compresses the lay-up preventing air and other gases, including volatile gases, from forming voids as the resin cures. The curing process is generally carried out in an autoclave.

While monolithic structures formed of fiber reinforced-resin composites processed in the manner described above are satisfactory for some environments they have certain disadvantages. For example, in using the fibers preimpregnated with resin, gases trapped between the layers when the resin is being cured form weakening voids in the resultant monolithic structure.

Another disadvantage with prior composites is the need to store such material at low temperatures. Conventionally, preimpregnated fiber reinforced layers, which are usually in the form of relatively wide tape or fabric on rolls prior to being laid up, are stored in a refrigerator environment. A further disadvantage is that even at low temperature, the resin will cure and may become unusable and must be discarded.

The disadvantages in the dry lay-up process include the use of more resin and more assembly time. The manner of resin application by brushing or spraying wastes resin and requires the removal of the excess resin before the curing process. Additionally, some manual smoothing may be necessary and the sticky resin makes it difficult not to avoid displacement of the reinforcement fibers which adds to production delays.

Vacuum bags techniques are well known in the art and encompass both the dry lay-up and the wet lay-up processes. After the reinforced fiber is laid up on a forming tool or mold surface, a flexible gas impervious sheet, liner or bag is used to form a sealed vacuum envelope over the lay-up, a heat liquid catalyzed resin is introduced into the envelope and a vacuum is drawn on the interior envelope space. The vacuum induces an internal collapse of the film envelope against the mold surface and forces the fiber mat or fabric to follow the mold pattern and pushes or pulls out voids. Thereafter, heat is applied to cure the resin.

The internal collapse of the vacuum envelope restricts the resin from freely flowing through the fiber mat or fabric which has a tendency to trap air and other vapors between the vacuum film envelope and the composite structure so as to result in low reinforcing fiber-to-resin ratio and nonuniformity. This reduces production rates and increases production failures and costs.

Some of the presently known vacuum bag techniques avoid some of the above discussed problems by employing a breather fabric with a plastic film which is positioned between the dry lay-up and the inside of the vacuum bag and barrier materials to prevent resin from reaching and plugging the vacuum lines in the bag. The breather bag functions to prevent the outer bag from collapsing completely on the lay-up.

Another approach to preventing bag closure is disclosed in U.S. Pat. No. 4,902,215 to Seeman, is herein incorporated by reference. This patent which relates to a resin distribution medium comprising spaced-apart plastic monofilaments which are non-resin absorptive running criss-cross and an open array of separated raised segments providing vertically oriented space-apart props or pillars to prevent closure between the inner face of the flexible sheet and the upper surface of the dry lay-up. The open pillar-like structure and lateral openings between these pillars provides channels for resin flow over the entire distribution medium without an entrainment of air or other gases. Both the breather fabric and the reusable resin distribution system of Seeman require additional expense in equipment and in production time.

Another approach to improving vacuum bag resin transfer molding techniques involves an improved vacuum bag. U.S. Pat. No. 5,129,813 to Shepherd, which is herein incorporated by reference, discloses a non-porous material having a three dimensional pattern defining a plurality of interconnected channels which upon collapsing upon the evacuation of the vacuum bag, the three dimensional pattern relaxes into a locally flat two dimensional configuration. The completely evacuated vacuum bag is in direct contact over the entire surface of the lay-up and the interconnected channels provides free flow of resin and avoids entrapment of air and gas pockets. The flexible film used in making the vacuum bag also can be reused.

All of the presently known vacuum bag molding methods, however, employ static fixed inlet feed positions reactant, i.e., feed inlets which are not adaptable for large structures. Particularly, since the peroxide or heat catalyzed resin encounters greater flow resistant as it flows over an enlarged area of reinforced fiber.

Since the reactant feed positions are not movable, the resin encounters greater flow resistance as it flows over a much larger area, which along with the resistance of the additional reinforcing fiber, lengthens the filling time of the mold surface. In some cases, the catalyzed resin system has a short pot life and the delay in filling the mold surface allows the resin to partially cure and the increase in viscosity prevents further resin transfer. In addition to the resin transfer problem, it is difficult to heat large structures evenly especially if the work is performed out of doors.

SUMMARY OF THE INVENTION

The present invention provides a novel process for the preparation of fiber reinforced composite structures comprising one or more layers of materials. More particularly, the process comprises the steps of:

A. enclosing at least one reinforcing fiber mat or fabric within a vacuum envelope wherein the envelope comprises at least one vacuum port, means for permitting flow of gases, especially air around the mat or fabric and at least one resin supply port;

B. evacuating the vacuum envelope at least partially or fully and introducing a flow of a resin selected from the group consisting of a photocurable resin, peroxide curable resin, heat curable resin and mixtures thereof so as to form a first resin impregnated layer; and then C. at least partially curing the first prepreg. Surprisingly, a mixture of a photocurable resin and a peroxide curable resin can be utilized.

Preferably, the resin impregnated layer is formed within a mold. A plurality of plys or layers can be prepared which are cured simultaneously or separately.

Advantageously, the means for permitting flow of air comprises a textured pattern in said envelope and the envelope is at least partially transparent.

The resin can be introduced into the envelope under atmospheric or positive pressure.

The present process has the advantage over prior art processes in that there is a reduction of volatile emissions, such as styrene.

DESCRIPTION OF THE PREFERRED EMBODIMENTS

According to one embodiment of the invention there is provided a process for preparing one or more plies of resin impregnated material comprising a fiber mat or fabric matrix and a photocurable and/or peroxide curable resin composition which utilizing vacuum bag molding techniques. That is, one or more fiber mats or fabrics are enclosed within a textured vacuum envelope having a resin supply source and at least one vacuum port. Advantageously, the fiber mats or fabrics are placed within a mold which can become a part of the structure. The vacuum envelope is evacuated at a pressure of about 1 to 28 inches mercury and a photocurable and/or peroxide curable resin in a premeasured amount is fed into the envelope. In order to expedite wetting out of the mat or fabric, the resin can be heated. After the fabric or mat is wetted out the pressure is brought to atmospheric. The structure is then cured.

When utilizing a mold that does not become a part of the structure, the mold is generally prepared with a non-stick composition such as a wax. When a plurality of layers are used in the preparation of the structure, it is preferred to offset the layers. A layer of continuous strand mat placed against the envelope improves resin flow.

The photocurable resin which is utilized is preferably a thermosetting resin when preparing structures for making boat hulls. The thermosetting resin advantageously contains at least one olefinically unsaturated monomer or an epoxy resin.

A layer of core material may be included within the composite structure. The core material may be transparent, non-transparent or a variable density core. Preferred core materials are balsa, honeycomb, or the like.

According to another embodiment of the invention there is provided a process for increasing the thickness of a composite structure without the formation of bond lines. The process comprises the steps of forming at least one layer of a wetted out fiber mat or fabric with a catalyzed photocurable resin as previously described, and before curing with ultraviolet radiation, laying a fiber mat or fabric over the previous stack and wetting out the top layer with uncatalyzed photocurable resin. Catalyst from the bottom stack leaches into the top layer so that upon exposure to U.V. light the catalyzed stack can be completely cured and the top most layer is only cured on the bottom. This procedure permits storage for a long period of time and allows for the formation or placement of additional layers of materials with catalyzed resins which also leach catalyst into the uncatalyzed resin. The additional layers can contain a peroxide catalyst or a photoinitiator to complete the curing of the entire stack.

The dry preform is formed of one or more layers or plies of reinforced fiber. Each ply is formed of a plurality of reinforcing and/or supporting fibers. The fibers may be in any conventional form such as unidirectional, woven fabric, knitted fabric, swirl mat, felt mat, wound, braided, etc. The orientation of the fibers is based on the desired directional strength of the resultant fiber reinforced resin composite. Some plies lie parallel to a predetermined direction which is usually the direction of the major force likely to be applied to the resulting monolithic structure. Such fibers may be glass fibers, resin impregnated glass fibers, carbon fibers, aramid, boron fibers, or polymeric fibers marketed under the trademarks KAPTON® and KEVLAR® by E. I. Dupont, Wilmington, Del.

The non-porous vacuum envelope can be produced using substrate films comprised of a variety of materials or formed partially by the reinforcing mat or fabric. Preferred are thermoplastic polyamide films, particularly films made of nylon -6 or nylon -66. Additional examples include films made of cured thermoset resin containing a reinforcement, polyethylene terephthalate, polyester ether ketone, polyetherimide, ethyl vinyl alcohol (EVOH), styrene/butadiene/rubber (SBR), polyvinyl chloride (PVC), fluorinated ethylene polymer (FEP) polyether sulfone, polytetrafluoroethylene, polyamide, teflon, acrylic resin and halohydrocarbon resins. The films may be mono- or biaxially oriented. The interior of the envelope can be ribbed, embossed, creped or otherwise raised or channeled to permit removal of gases including air and distributing resin.

The invention is not limited to any particular genus of resin. Rather, a wide variety of resins are available that will adequately flow through a dry preform when the invention is practiced in the manner heretofore described. Resins include epoxy, olefinically unsaturated polyesters, vinyl esters and an olefinically unsaturated monomer copolymerizable therewith. The viscosities of resins range from about 100 cps to about 1000 cps over a temperature range between 200 degrees to 340 degrees F.

The polyester resins used in the invention can be prepared in any convenient manner and is generally composed for one or more aliphatic and/or cycloaliphatic, mono-, di and/or esters thereof. As examples of suitable alcohols may be alcohols and one or more monovalent carboxylic acids and/or esters thereof. As examples of suitable alcohols may be mentioned benzyl alcohol, ethylene glycol, propylene glycol, neopentyl glycol, hexanediol, dimethylol cyclohexane 2,2-bis-(4-hydroxycyclohexyl) propane, 2,2-bis-(p-phenyleneoxyethanol)-propane, 2,2-bis-(p-phenyleneoxypropanol-2)-propane, diethylene glycol, glycerol, trimethylol ethane, trimethylol ethane, trimethylol propane, pentaerythritol and/or dipentaerythritol. Instead of, or besides the alcohol compound(s) one or more epoxy compounds may be used, for instance ethylene oxide, propylene oxide, epoxy propanol and isodecanoic glycidyl ester. As examples of suitable di- or polyvalent carboxylic acids may be mentioned maleic acid, fumaric acid, itaconic acid, citraconic acid, malonic acid, succinic acid, glutaric acid, adipic acid, azelaic acid, sebacic acid, tetrahydrophthalic acid, hexahydrophthalic acid, dichlorophthalic acid, isophthalic acid, terephthalic acid and/or trimellitic acid. The carboxylic acid also may be used in the form of an anhydride should be employed besides isophthalic acid and/or orthophthalic acid. Optionally, the polyester resin may contain saturated or unsaturated monocarboxylic acids such as synthetic and/or natural fatty acids having 2 to 36 carbon atoms or esters prepared from these carboxylic acids an polyvalent alcohols such as glycerol. As examples of suitable monocarboxylic acids may be mentioned fatty acid precondensates having 5 to 10 carbon atoms, heptanoic acid, pelargonic acids, isononanoic acid, lauric acid, stearic acid, oleic acid, linoleic acid, cerotic acid, benzoic acid, tert-butylbenzoic acid, acrylic acid and/or methacrylic acid.

The polyester resin may be prepared in any convenient manner, for instance by the melting process, in which reaction of the components takes place with evaporation of the water evolved in the reaction. Alternatively, however, use may be made of the solvent process, in which the water is removed azeotropically with, for instance, an organic solvent such as toluene or xylene, after which generally the volatile constituents are to the desired extent removed in vacuo.

As ethylenically unsaturated monomer any usual monomer may be employed. As examples of suitable monomers may be mentioned styrene, $\alpha$-methyl styrene, vinyl toluene, divinyl benzene, diallyl phthalate and acrylic or methacrylic (hydroxy) esters of alcohols having 1 to 12 carbon atoms such as methanol, ethanol, propanol, butanol, ethylene glycol, propylene glycol, neopentyl glycol, butanediol, hexanediol, polyethylene glycol, glycerol, trimethylol ethane, trimethylol propane and pentaerythritol. It is preferred that styrene should be used. Also suitable are mixtures of monomeric compounds, more particularly mixtures of styrene and other monomers. The monomeric compound is usually present in the composition in an amount of 2 to 55% by weight, based on the polyester composition.

The resin may be cured free radical generating compounds such as organic peroxide catalysts. A preferred curing method involved photopolymerization. Curing may be done in a continuous manner. The process can be repeated to give a multi-layer composite. Compatible resins may be used to give a multi-layer composite and provide either esthetic affects or increased structural strength or both.

In the present invention, the resin and catalyst may be mixed just prior to introduction into the vacuum envelope or they may be introduced separately relying on the dynamics of the system to mix these compounds sufficiently. In the preferred photocuring process the catalyst can comprise any conventional photoinitiators and/or photosenitizers. The preferred photoinitiators are isobutyl benzoin ether and $\alpha$, $\alpha$-diethoxyacetophenone. Mixtures of photoinitiators may be used. The preferred photosenitizers are the acylphosphine oxides as disclosed in U.S. Pat. No. 4,265,723, which is herein incorporated by reference, and the photosenitizers which have a triplet energy in the range of about 54 to 72 kilocalories per mole as disclosed U.S. Pat. No. 4,017,652, which is herewith incorporated by reference.

Any suitable source that emits ultraviolet light, viz., electromagnetic radiation having a wave length in the range of from about 1800 to about 4000 Angstrom units, may be used in the practice of this invention. Suitable sources are mercury arcs, carbon arcs, low pressure mercury lamps, medium pressure mercury lamps, high pressure mercury lamps, swirling flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2037, 60-0197, 60-0393, and 60-2081 and Hanovia Models 6512A431, 6542A431, and 6477A431.

The time of exposure to ultraviolet light and the intensity of the ultraviolet light to which the coating composition is exposed may vary greatly. Generally the exposure to ultraviolet light should continue until the polymerization is complete.

The order of curing is not critical when different curing catalyst are utilized. The different resins or resin layers may be cured simultaneously or sequentially and/or post cured by autoclaving.

The technique described herein are capable of some variations without departing the spirit and scope of this invention as will be apparent to those of skill in this art.

EXAMPLE 1

A standard mold for a fiberglass boat hatch was used to demonstrate the processes described, except a resin input and vacuum outlet on the flange area, just outside from the part trim line was added to the mold.

A gelcoat was sprayed into the mold and allowed to cure until it was not sticky to the touch.

Precut dry reinforcement layers were placed into the mold in the shape of the part to be made.

Quick Draw textured film (Polyester Thermoplastic (Mylar) and is transparent to UV light) was laid over the mold and folded and generally conformed into the mold and laid out around the flange. An adhesive compound, known as tacky tape, was laid around the edges of the flanges and input and outlet ports, and the film stuck to the tape using standard vacuum bagging techniques.

The vacuum pump was hooked up to the outlet port and a resin inlet tube with a valve was attached to input side. The valve was in the off position.

Vacuum was applied the outlet side to a maximum of 28 inches of mercury.

The air was evacuated from the mold. The mold, seal and bag were checked to insure that no leaks were present. The resin valve was open slowly and the resin allowed to enter the mold.

The resin traveled across the mold wetting out the fiber. Any air left behind by the traveling resin front was evacuated, pulled to surface of the Quick Draw film and evacuated because of the channels in the film.

When the prescribed amount of resin was in the mold, the resin valve was closed. The vacuum was allowed to remain on to allow full wetting of the fiber and consolidation of the part. When the part was sufficiently consolidated, the ultraviolet light was turned on to cure the part.

After the part was cured, the film was removed from the part and then removed the part from the mold. The part was then processed normally.

EXAMPLE 2

A. Into a prepared of 8'×12' mold was laid 8 layers of woven fiberglass mat (50"×8"). The mats overlapped the prior mat by 4 inches. A total of eight layers were added to the mold. Bag sealing tape was stuck to the mold around the perimeter of the material. Vacuum tubes and resin supply tubes were positioned on the mats. The vacuum and resin supply tubes were attached to the sealing tape. A vacuum bag was placed over the mold and sealed to the tape around the perimeter. Vacuum is applied to check for leaks. When there are no leaks the resin supply was opened and DERAKANE 470, a vinyl ester novolak resin sold by The Dow Chemical Company, which contained PALATAL, a light curing catalyst sold by SUNREZ Corporation, El Cajon, Calif., which is an aroyl diphosphene oxide at a 10–15" mercury vacuum. When the resin had wet out the fibers the vacuum was held at 15" mercury for 15 minutes. The structure can be cured by irradiating with ultraviolet light.

B. Preparation of additional plied structure.

Onto the mats of Part A prior to irradiation is placed a single fiberglass mat. The process of Part A is repeated except that DERAKANE 470 without catalyst is applied to the top mat. After the top mat is wetted out the pressure in the bag is equalized. U.V. lamps are then turned on and the resin is cured except for the top mat which is cured at the boundary where catalyst from the adjacent mat leached into the uncured resin.

Three fiberglass mats were laid on top of the partially cured mat of Part B. The process of Part A was used and the three mats were wetted out with the resin and catalyst. After the pressure was equalized, the U.V. lamps were used to cure the uncured portions.

When the entire composite was cured it was not possible to detect which mat constituted the mat of Part B.

EXAMPLE 3

Mold size was 8'×12'. The mold was prepared wiping clean and waxing. Fiberglass (32 oz. knitted biaxial roving) fabric was laid on mold in 50" wide layers across the 8' width. Material was overlapped by 4 inches onto the prior width. Additional plies were laid over the preceding ply but offset by 16 inches from the prior seam of the lower layers. Additional lengths of cut material were used to fill in for the beginning 16 inches plus overlap. A total of 8 layers were added to the mold (approx. 170 lbs.).

The fabric was pre-cut to fit the size requirement, and trimmed to fit on the mold. A 2 oz. nylon release cloth was cut to size and laid on top of the glass fabric stack.

Bag sealing tape was stuck to the mold 2" from edges of the material around the perimeter. The vacuum tubes and resin tubes were placed in the desire position and attached to the material to hold them in place prior to the bag being placed over the mold. The resin and vacuum supply tubing were attached to the sealing tape and additional tape was applied to the tubing to ensure a seal. The bag (Quick Draw™ clear textured film) was placed over the glass stack. The bag is sealed to the tape around the perimeter and special attention paid to the vacuum and resin supply tubing.

Vacuum was applied to the bag with the resin supply turned off. The bag was drawn down on the laminate stack and held for a time to assure that there are no leaks. When it was determined that there were no leaks then the resin supply was opened and the resin allowed to be drawn into the bag. Approximately 150 lbs. of resin was allowed to flow into the bag. The resin was pre-measured into the bag to the exact amount necessary to achieve the proper ratio of resin to glass (in this case 55–58% glass). The resin had a head pressure of approx. 2–3 lbs. at the bottom of the bag due to the resin barrel being placed on an elevation above the laminate, although required. When the resin had wet out the fibers the resin supply was turned off and the vacuum brought to about 15" hg to prevent boiling of the styrene in the resin as the temperature rises during the curing exotherm. When the pressure was equalized within the bag, the lamps are turned on and the part cured. The UVA lamp array (15"×8') was turned on and each successive area of the laminate was cured for 10 minutes in overlapping 15"×8' sections for a total of 10 movements of the lamp (100 minutes).

After curing the bagging film and all tubing for resin and Vacuum was removed and the part optionally removed from the mold. At this point, the part can be further prepared by any secondary operations necessary.

What is claimed:

1. A process for the preparation of boat hulls having one or more fiber layers that can be used to combine with other photocurable structures without forming bond lines, said process comprises the steps of:

A. enclosing at least one reinforcing fiber mat or fabric within an ultraviolet radiation transparent conformable and textured vacuum film forming an upper layer and a lower substrate to form a vacuum chamber, said film permitting transmission of ultraviolet radiation and flow of gases and resin around said mat or fabric, said chamber having at least one vacuum port and at least one resin supply port;

B. evacuating said vacuum chamber and introducing a flow of a photocurable resin so as to form a rein impregnated layer or layers of reinforcement; and then C. partially photocuring said resin impregnated layer or layers whereby said partially cured layer or layers are capable of being bonded to other photocurable structures without forming bond lines.

2. The process of claim 1 wherein said chamber is evacuated to 1 to 28 inches of mercury below atmospheric pressure.

3. The process of claim 1 wherein the textured film is comprised of a thermoplastic or elastomeric plastic selected from the group consisting of polytetrafluoroethylene, polyvinyl chloride, polyester, polyolefin, polyamide, nylon, EVOH, polyurethane, silicone, cellophane, cellulose esters, SBR, polycarbonate, ionomer and polyvinyl acetate fluorocarbons.

4. The process of claim 1 wherein the resin of step B is a thermoset resin drawn essentially from the group consisting of unsaturated polyester resins, vinyl ester resins, epoxy resins, reactive olefinically unsaturated monomer, and acrylic monomers.

5. The process of claim 1 wherein the vacuum film is composed of a cured thermoset resin containing a reinforcement.

6. The process of claim 1 wherein the fiber of the mat or fabric comprises carbon, glass, Kevlar, acrylic, nylon, polyester, ceramic, or metal.

7. A process of claim 1 wherein at least one mat of continuous strands are placed against the film for improved resin flow.

8. The process of claim 1 wherein the vacuum chamber is permanently laminated to a finished structure or part.

9. The process of claim 1 wherein the mat or fabric is placed on a mold which forms part of the film.

10. The process of claim 9 wherein the reinforcing mat or fabric consists both of resin preimpregnated glass reinforcement and dry fiberglass reinforcement layers.

11. The process of claim 1 wherein said reinforcing fiber or mat is resin preimpregnated glass reinforcement.

12. The process of claim 1 wherein the reinforcing mat or fabric layers and a layer of core material are cured together.

* * * * *